(12) United States Patent
McLean, III (10) Patent No.: US 8,683,727 B2
(45) Date of Patent: Apr. 1, 2014

(54) FIREARM ACCESSORY PART WITH TRACKING CAPABILITY

(75) Inventor: Donald A. McLean, III, Lititz, PA (US)

(73) Assignee: DM Innovations, Lititz, PA (US)

( * ) Notice: Subject to any disclaimer, the term of this patent is extended or adjusted under 35 U.S.C. 154(b) by 97 days.

(21) Appl. No.: 12/927,729

(22) Filed: Nov. 22, 2010

(65) Prior Publication Data

US 2012/0125189 A1    May 24, 2012

(51) Int. Cl.
*F41A 17/00* (2006.01)

(52) U.S. Cl.
USPC .......................................................... 42/70.01

(58) Field of Classification Search
USPC ............................................. 42/70.01–70.11
See application file for complete search history.

(56) References Cited

U.S. PATENT DOCUMENTS

| | | | | |
|---|---|---|---|---|
| 5,487,234 A * | 1/1996 | Dragon | ......................... | 42/70.07 |
| 5,509,226 A | 4/1996 | Houde-Walter | | |
| 6,438,887 B1 * | 8/2002 | Martin | ......................... | 42/70.11 |
| 6,823,621 B2 * | 11/2004 | Gotfried | ...................... | 42/70.06 |
| 7,421,818 B2 | 9/2008 | Houde-Walter | | |
| 7,743,547 B2 | 6/2010 | Houde-Walter | | |
| 2002/0178635 A1 * | 12/2002 | Martin | ......................... | 42/70.11 |
| 2006/0117632 A1 * | 6/2006 | Meyerle | ....................... | 42/70.01 |
| 2006/0208857 A1 * | 9/2006 | Wong | ........................... | 340/5.82 |
| 2011/0309975 A1 | 12/2011 | Chu | | |

OTHER PUBLICATIONS

Portman Security Announces New Weapons and Body Armor GPS Tracking System (WITS).
GPS Tracking Devices for Security and Law Enforcement (http://www.portmansecurity.com/by-industry-law-enforcement.php).
Portable GPS System, Personal Tracking Devices (http://www.portmansecurity.com/gps-tracking-personal-trackers.php).

* cited by examiner

*Primary Examiner* — Samir Abdosh
(74) *Attorney, Agent, or Firm* — Bennet K. Langlotz; Langlotz Patent & Trademark Works, Inc.

(57) ABSTRACT

A firearm accessory part has a locator module and a transmitter module. The locator module is operable to determine the locator module's position. The transmitter module is operable to transmit the position of the locator module. The firearm accessory part is a replacement part for a firearm. Removal of the firearm accessory part from the firearm may disable a feature of the firearm. Removal of the firearm from a storage device may activate the locator module and transmitter module. The invention also includes a method of assembling a firearm consisting of the steps of obtaining a firearm, obtaining a firearm accessory part, removing a part of the firearm corresponding to the firearm accessory part, and replacing the part removed from the firearm with the firearm accessory part.

13 Claims, 12 Drawing Sheets

FIREARM ACCESSORY PART WITH TRACKING CAPABILITY

FIELD OF THE INVENTION

The present invention relates to a firearm accessory part for tracking the location of a firearm, and more particularly to a firearm accessory part that disables the firearm when removed and that has its tracking capability activated when the firearm is removed from its storage location.

BACKGROUND OF THE INVENTION

Police departments are increasingly deploying technologies to both collect evidence and improve officer accountability. Examples of these technologies include video and audio recording equipment in police cars. There is also a desire to track the status and location of officers' firearms.

A known example of a system for tracking and monitoring an officer's weapon is the Weapons Intelligent Tracking System by Portman Security Systems. At least some aspects of the system are described in U.S. patent application Ser. No. 12/187,110. The firearm tracking portion of the system is a Global Positioning System (GPS) locator that attaches to the universal rail of any firearm, rifle, or pistol. The locator sends automatic report stamped with time and GPS data when a weapon is drawn and each time it is fired. The device also reports on incoming gunfire. However, because the locator is a firearm accessory part whose removal does not affect operation of the firearm, an officer or an unauthorized user of the firearm could easily temporarily or permanently remove it while continuing to use the firearm. Furthermore, the locator cannot be used with a firearm that lacks a universal rail.

It is therefore an object of this invention to provide a firearm accessory part that disables the firearm when removed and that has its tracking capability activated when the firearm is removed from its storage location.

SUMMARY OF THE INVENTION

The present invention provides an improved firearm accessory part, and overcomes the above-mentioned disadvantages and drawbacks of the prior art. As such, the general purpose of the present invention, which will be described subsequently in greater detail, is to provide an improved firearm accessory part that has all the advantages of the prior art mentioned above.

To attain this, the preferred embodiment of the present invention essentially comprises a locator module and a transmitter module. The locator module is operable to determine the locator module's position. The transmitter module is operable to transmit the position of the locator module. The firearm accessory part is a replacement part for a firearm. Removal of the firearm accessory part from the firearm may disable a feature of the firearm. Removal of the firearm from a storage device may activate the locator module and transmitter module. The invention also includes a method of assembling a firearm consisting of the steps of obtaining a firearm, obtaining a firearm accessory part, removing a part of the firearm corresponding to the firearm accessory part, and replacing the part removed from the firearm with the firearm accessory part. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

The same reference numerals refer to the same parts throughout the various figures.

DESCRIPTION OF THE CURRENT EMBODIMENT

A first embodiment of the firearm accessory part of the present invention is shown and generally designated by the reference numeral 10.

Figure 1:
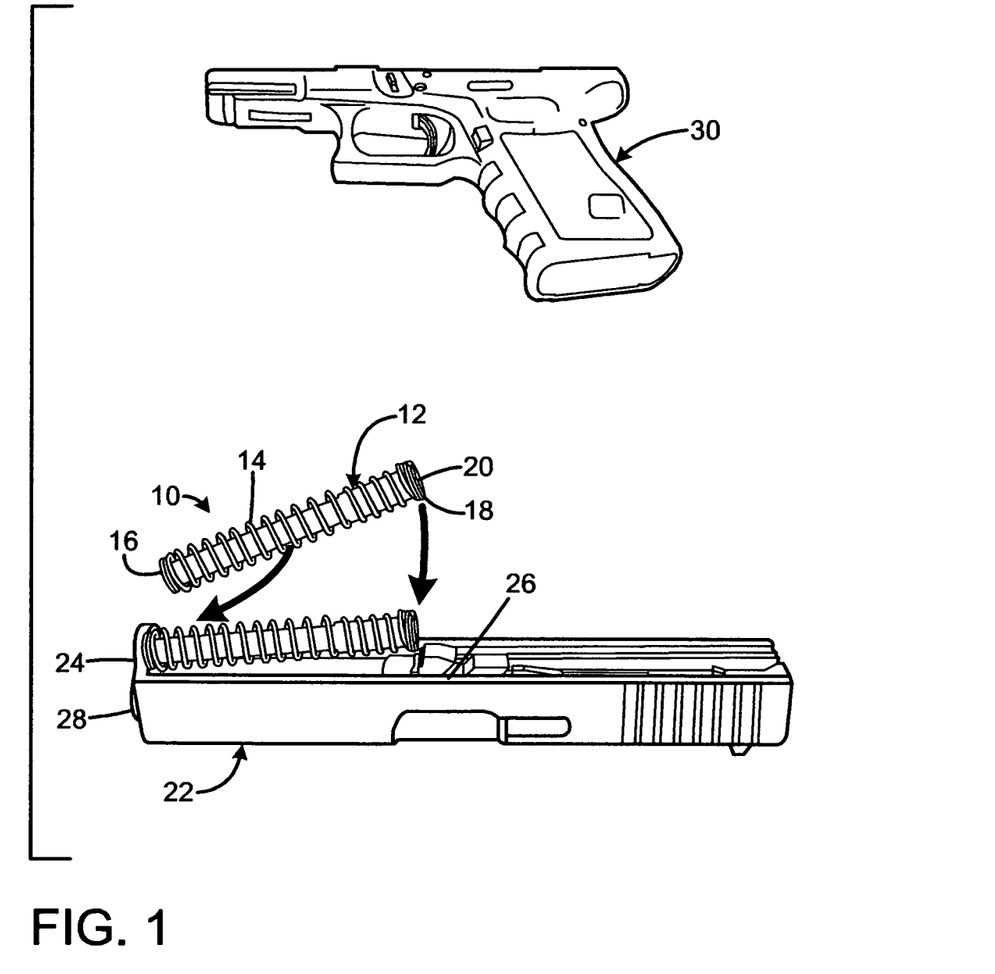
FIG. 1 is a bottom perspective view of the firearm accessory part of the present invention constructed in accordance with the principles of the present invention attached to the slide of a pistol.

FIG. 1 illustrates the firearm accessory part 10 of the present invention attached to the slide 22 of a pistol 30. More particularly, the first embodiment of the firearm accessory part serves as a guide rod 12, replacing the pistol's original guide rod. The guide rod 12 is mounted on the bottom 26 of the slide below the muzzle 28 with the front end received by the slide's barrel lug 24. The guide rod is cylindrical and has a recoil spring 14 mounted on its exterior. The spring extends from the front 16 to the end cap 20 on the rear 18 of the guide rod. The guide rod prevents the spring from buckling when the slide recoils, making the guide rod essential for the operation of the pistol. Removal of the guide rod prevents the pistol from operating.

Figure 2:
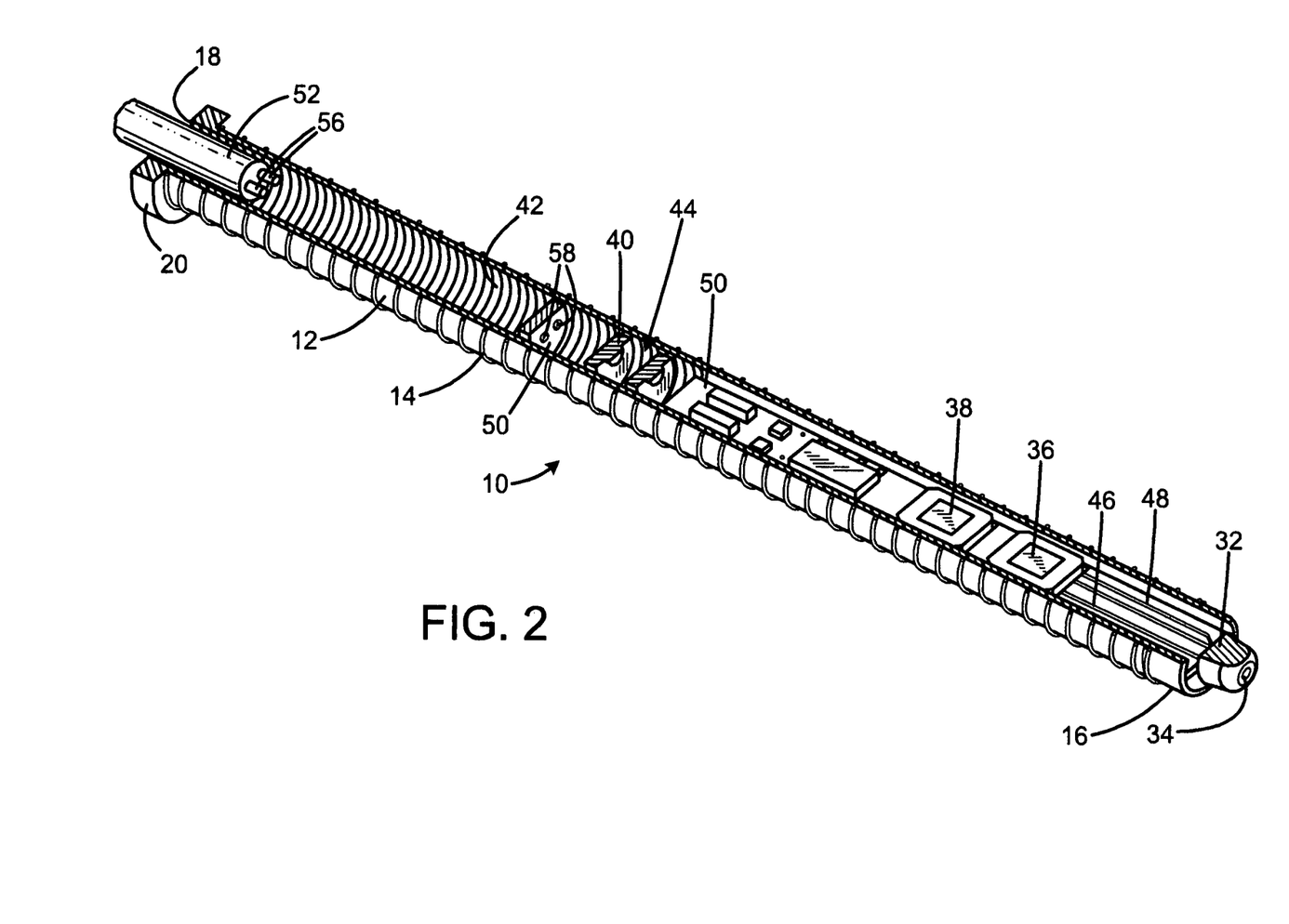
FIG. 2 is a top perspective sectional view of a first embodiment of the firearm accessory part of the present invention with its internal components exposed.

FIG. 2 illustrates the internal components of the firearm accessory part 10 of the present invention. More particularly, the guide rod has a hollow threaded interior 42 with an open front 16 and rear 18. The end cap 20 is attached to the rear of the guide rod. The hollow interior receives a printed circuit board assembly 44 and one or more batteries 40. The circuit board assembly consists of a substrate 50 that has multiple components mounted on it. The components include a locator module 36 and a transmitter/control module 38. A pressure switch 32 protrudes from the front of the guide rod so it can be activated by the switch activator 34. The switch activator 34 will be described in more detail in the discussion of FIGS. 4 and 5. Conductive pathways 46 and 48 electrically connect the pressure switch to the locator module 36. Additional conductive pathways etched on the substrate electrically connect the locator module to the transmitter/control module. Wires electrically connect the transmitter/control module to the batteries.

A threaded plug 54 is releasably secured within the hollow threaded interior 42 of the guide rod with a special tool 52. The threaded plug cannot be unscrewed from the interior of the guide rod unless the prongs 56 of the tool are first inserted into the apertures 58 of the plug. This requirement prevents tampering with the batteries 40 or other components of the printed circuit board assembly 44.

When the batteries 40 are discharged, they can either be replaced or inductively charged using an appropriate charging station.

The transmitter/control module 38 monitors and is responsive to the status of the pressure switch 32, determines when the locator module acquires location data, and transmits the location data to a dispatcher. Limiting frequent acquisition and transmission of location data to only when the pressure switch is deactivated prolongs the life of the batteries between charges or replacement. The location data can be transmitted via satellite, cellular networks, and/or by broadcasting a signal directly to the dispatcher's location.

The transmitter/control module may periodically instruct the locator module to acquire location data even when the pressure switch 32 is activated. The transmitter/control module may transmit the location data to a dispatcher if the location is outside of a predefined range during a predetermined time period, even when the pressure switch 32 is activated. The officer's precinct can determine the range, and the timing of the shift can determine the time period.

Responsive to the pressure switch being deactivated, which indicates the firearm has been removed from storage, the transmitter/control module would immediately instruct the locator module to acquire location data, transmit the location data to a dispatcher, and continue to do so at a predetermined frequency until the pressure switch is reactivated. Reactivation of the pressure switch would require a special tool, typically kept at the police station. This would prevent transmission of the location data from being stopped if the officer's weapon was stolen.

The locator module 36 employs one or more techniques to determine the location of the firearm accessory part 10. These can include GPS, triangulation based on wireless network or cellular network signals, and inertial sensing. This combination of techniques enables the locator module to acquire location data under a wide range of conditions, including outdoors, indoors, and underground. The location data is provided to the transmitter/control module when the transmitter/control module requests it.

Figure 3:
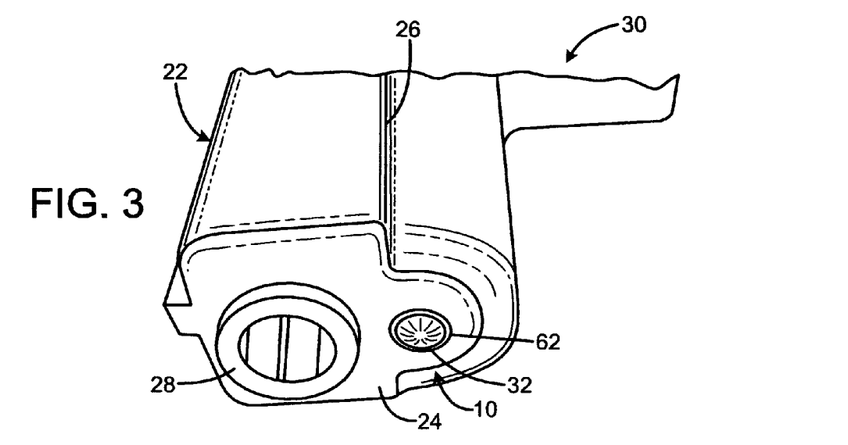
FIG. 3 is a front perspective view of the first embodiment of the firearm accessory part of the present invention attached to the slide of a pistol.
Figure 4:
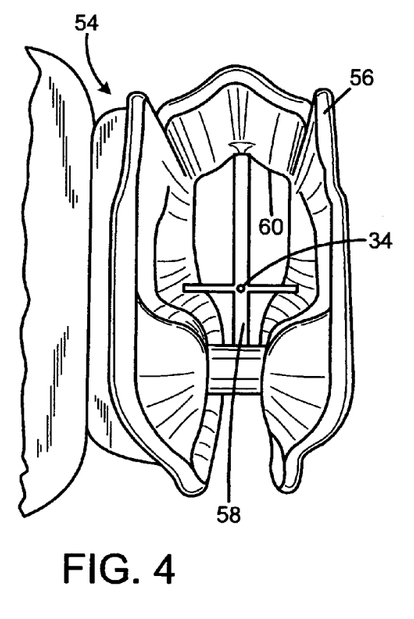
FIG. 4 is a top perspective view of a holster modified for use with the first embodiment of the firearm accessory part of the present invention.
Figure 5:
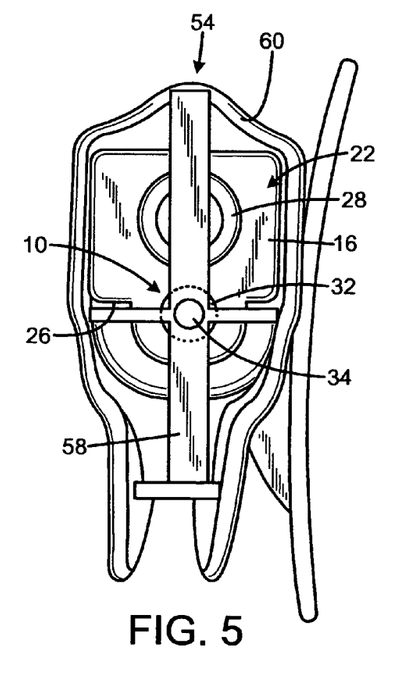
FIG. 5 is a bottom perspective view of a holstered pistol with the first embodiment of the firearm accessory part of the present invention attached to its slide.

FIGS. 3-5 illustrate how the firearm accessory part 10 interacts with a special holster 54 to determine when the pistol 30 has been drawn. More particularly, the front 24 of the slide 22 has an aperture 62 positioned below the muzzle 28. The pressure switch 32 protrudes through the aperture 62. The holster 54 has an activator support 58 attached to the holster's bottom 60. The switch activator 34 is a raised bump pointing upwards towards the top 56 of the holster. When the front of the slide is inserted into the holster, the pressure switch rests on the switch activator, which activates the pressure switch. Activation of the pressure switch informs the transmitter/control module 38 that the pistol is holstered.

Figure 6:
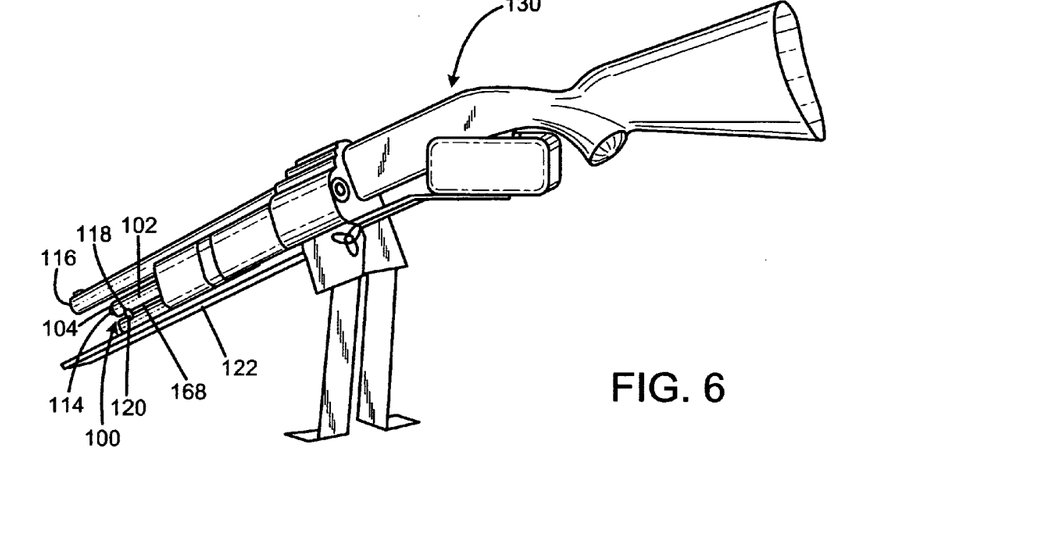
FIG. 6 is a bottom perspective view of a second embodiment of the firearm accessory part of the present invention constructed in accordance with the principles of the present invention attached to a shotgun.
Figure 7:
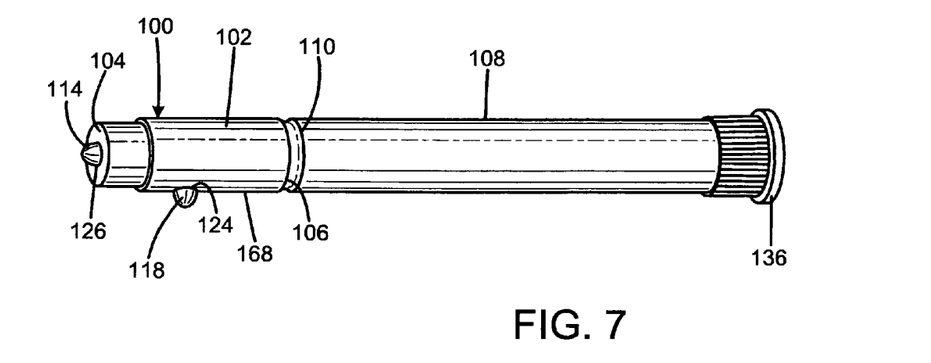
FIG. 7 is a side view of the second embodiment of the firearm accessory part of the present invention attached to the magazine tube extension of a shotgun.

FIGS. 6 and 7 illustrate the second embodiment of the improved firearm accessory part 100 of the present invention attached to the magazine tube 108 of a shotgun 130. More particularly, the firearm accessory 100 has a housing 102 whose rear 106 has an end cap 136 that attaches with threads to the front 110 of the magazine tube, which is located below the muzzle 116. The shot gun magazine tube has threads on its forward end that receive the end cap. The firearm accessory 100 can either be configured to replace a stock cap or all of the standard magazine tube, or the accessory can be an added extension to the stock magazine tube. In the illustrated embodiment, the housing closes off the front end of the magazine tube by replacing a stock cap. If the firearm accessory 100 is removed, it will make the shotgun a single shot. Because the magazine spring and shell follower will not stay in the magazine tube, additional shells cannot be loaded.

A pressure switch cap 114 and/or a pressure switch cap 118 protrude from the front 104 and/or bottom 168 of the housing through apertures 126 and 124. The option of multiple pressure switch locations enables the firearm accessory 100 to be used with different types of shotgun storage racks. In FIG. 6, the rack 122 has a switch activator 120 that activates the pressure switch 134 beneath the pressure switch cap 118.

Figures 8, 9:
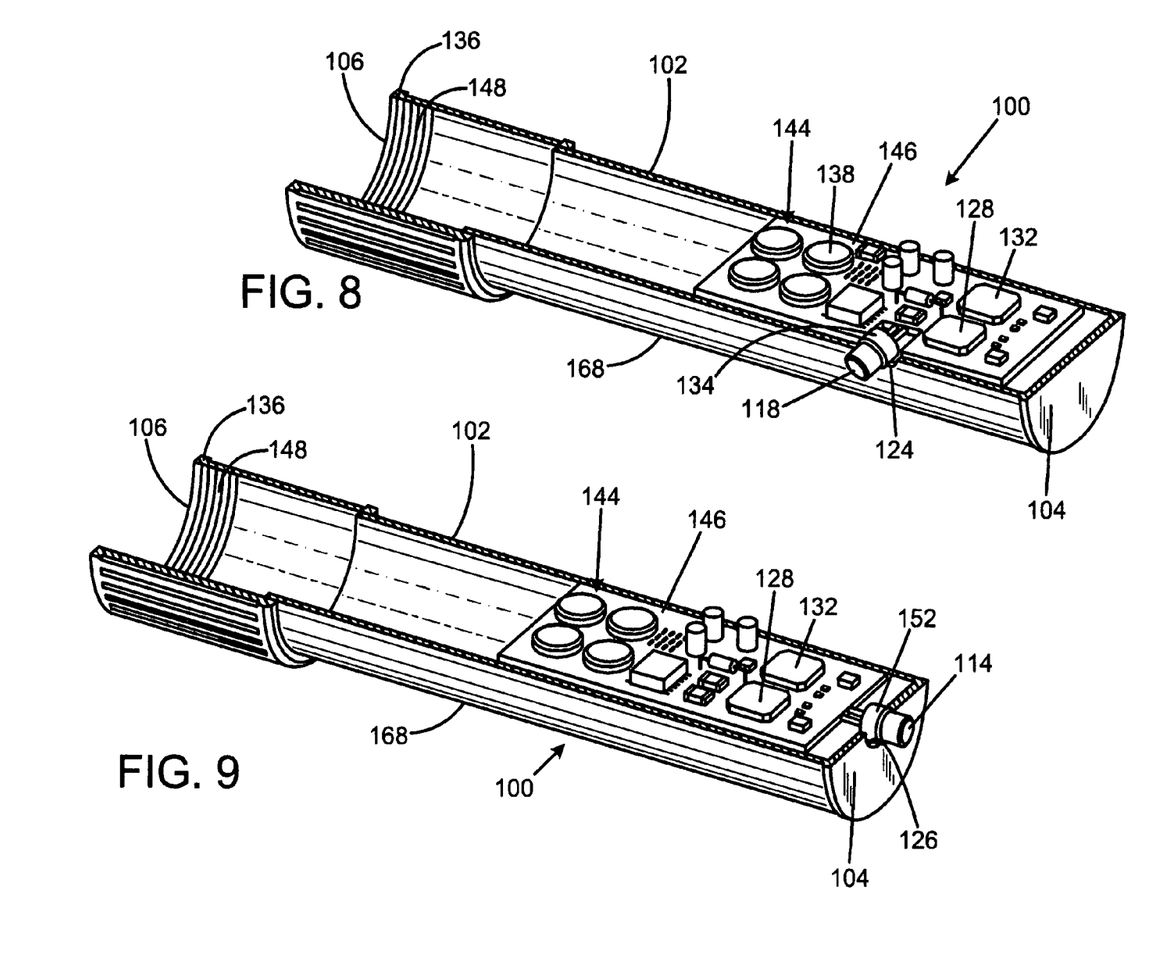
FIG. 8 is a bottom perspective sectional view of the second embodiment of the firearm accessory part of the present invention with its internal components exposed.
FIG. 9 is a top perspective sectional view of the second embodiment of the firearm accessory part of the present invention with its internal components exposed.

FIG. 8 illustrates the firearm accessory part 100 of the present invention with a bottom pressure switch 134 with its internal components exposed. More particularly, the housing 102 is a hollow cylinder with an open rear 106. The hollow housing receives a printed circuit board assembly 144. The circuit board assembly consists of a substrate 146 that has multiple components mounted on it. The components include one or more batteries 138, a locator module 128, and a transmitter/control module 132. The locator module 128, transmitter/control module 132, and batteries 138 have the same characteristics and functions as the locator module 36, transmitter/control module 38, and batteries 40.

A pressure switch cap 118 protrudes downwards through the aperture 124 in the bottom 168 of the housing 102. A pressure switch 134 is positioned inside of the housing behind the pressure switch cap.

Conductive pathways etched on the substrate electrically connect the pressure switch to the locator module. Additional conductive pathways etched on the substrate electrically connect the locator module to the transmitter/control module and electrically connect the transmitter/control module to the batteries.

The end cap has female threads 148 that screw onto male threads on the front of the magazine tube 108. A special tool is required to disconnect the end cap from the magazine tube or to disconnect the end cap from the housing.

FIG. 9 illustrates the firearm accessory part 100 of the present invention with a front pressure switch 152 with its internal components exposed. More particularly, the only difference between FIG. 9 and FIG. 8 is the location of the pressure switch and its related parts. A pressure switch cap 114 protrudes forwards through the aperture 126 in the front 104 of the housing 102. A pressure switch 152 is positioned inside of the housing behind the pressure switch cap.

Figure 10:
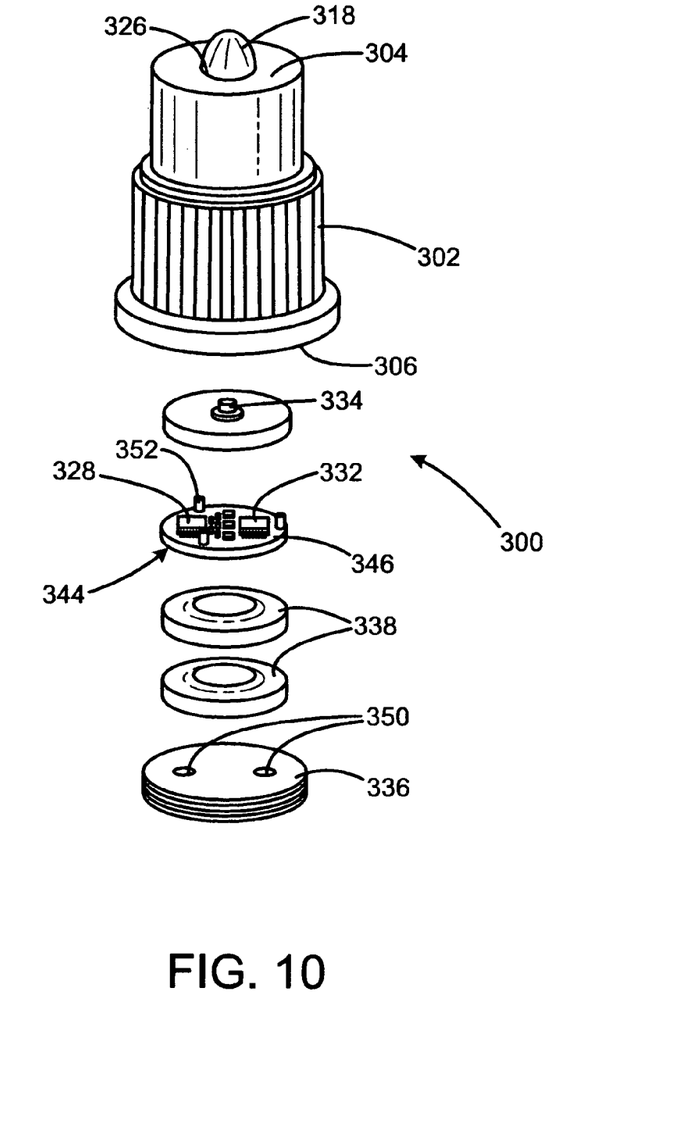
FIG. 10 is a top perspective exploded view of a third embodiment of a firearm accessory part of the present invention constructed in accordance with the principles of the present invention for attachment to the magazine tube of shotgun.

FIG. 10 illustrates the third embodiment of the improved firearm accessory part 300 of the present invention. The firearm accessory 300 is a shortened version of the embodiment illustrated in FIG. 9 that replaces the stock magazine tube cap without increasing the length of the magazine tube. More particularly, the firearm accessory 300 has a housing 302 whose rear 306 is threaded to screw onto the male threads on the end of a shotgun magazine tube. A pressure switch cap 318 protrudes from the front 304 of the housing through apertures 326.

The hollow housing 302 receives a printed circuit board assembly 344 and one or more batteries 338. The circuit board assembly consists of a substrate 346 that has multiple components mounted on it along with support posts 352 that protect the components from the pressure switch. The components include a locator module 328 and a transmitter/control module 332. Wires electrically connect the pressure switch to the locator module and the transmitter/control module to the batteries. Conductive pathways etched on the substrate electrically connect the locator module to the transmitter/control module. The locator module 328, transmitter/control module 332, and batteries 338 have the same characteristics and functions as the locator module 36, transmitter/control module 38, and batteries 40.

The rear of the housing 302 receives a plug 336 with apertures 350 that requires a special tool 52 in order to unscrew it from the housing to expose the batteries 338 and printed circuit board assembly 344. If the firearm accessory 300 is removed, it will make the shotgun a single shot. Because the magazine spring and shell follower will not stay in the magazine tube, additional shells cannot be loaded.

Figure 11:
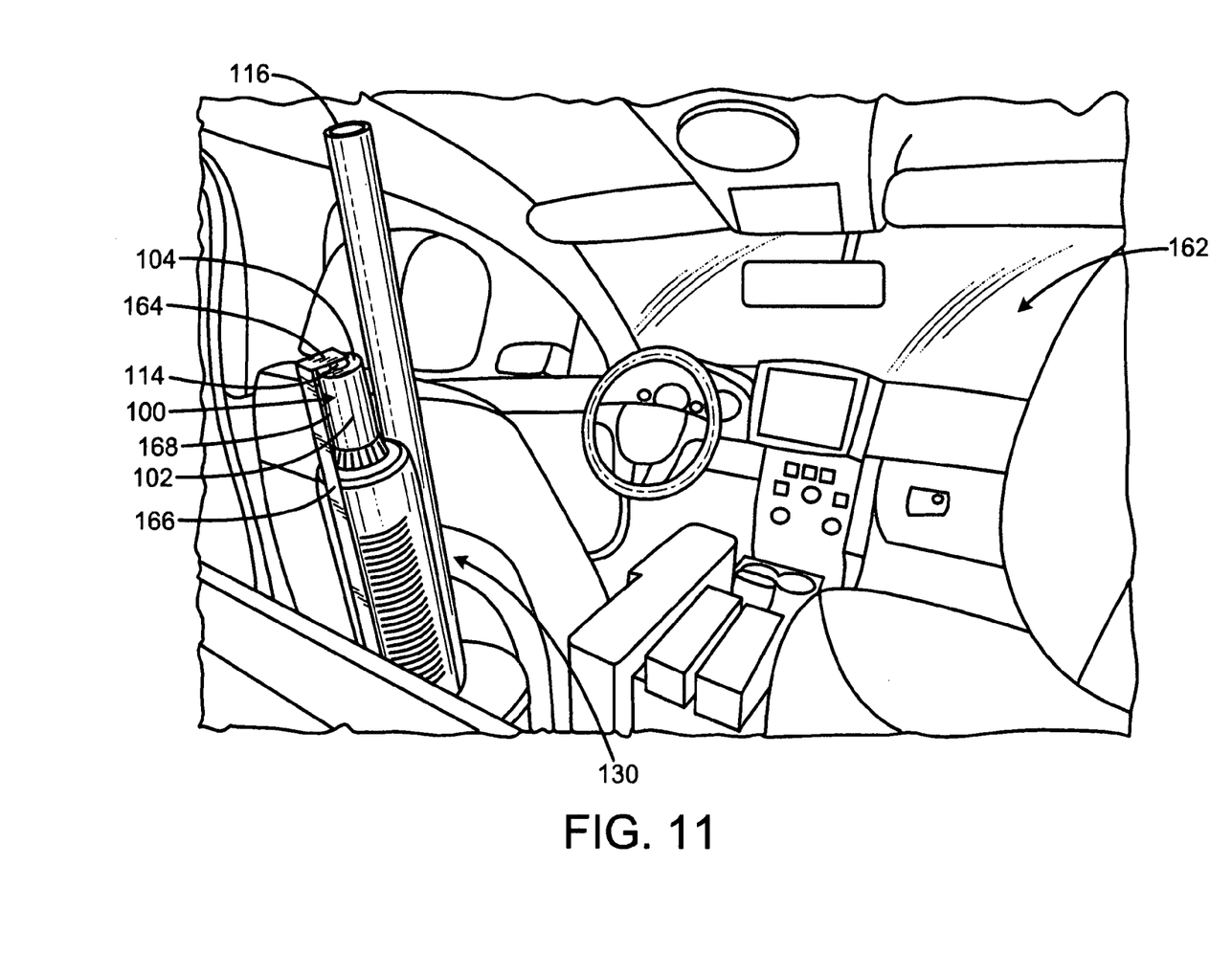
FIG. 11 is a front perspective view of the shotgun with the second embodiment of the firearm accessory part of the present invention attached stored in a police car in a rack.

FIG. 11 illustrates the firearm accessory part 100 of the present invention with a front pressure switch 152 stored in a police car interior 162. The rack 166 has a switch activator 164 that activates the pressure switch 152 beneath the pressure switch cap 114.

Figure 12:
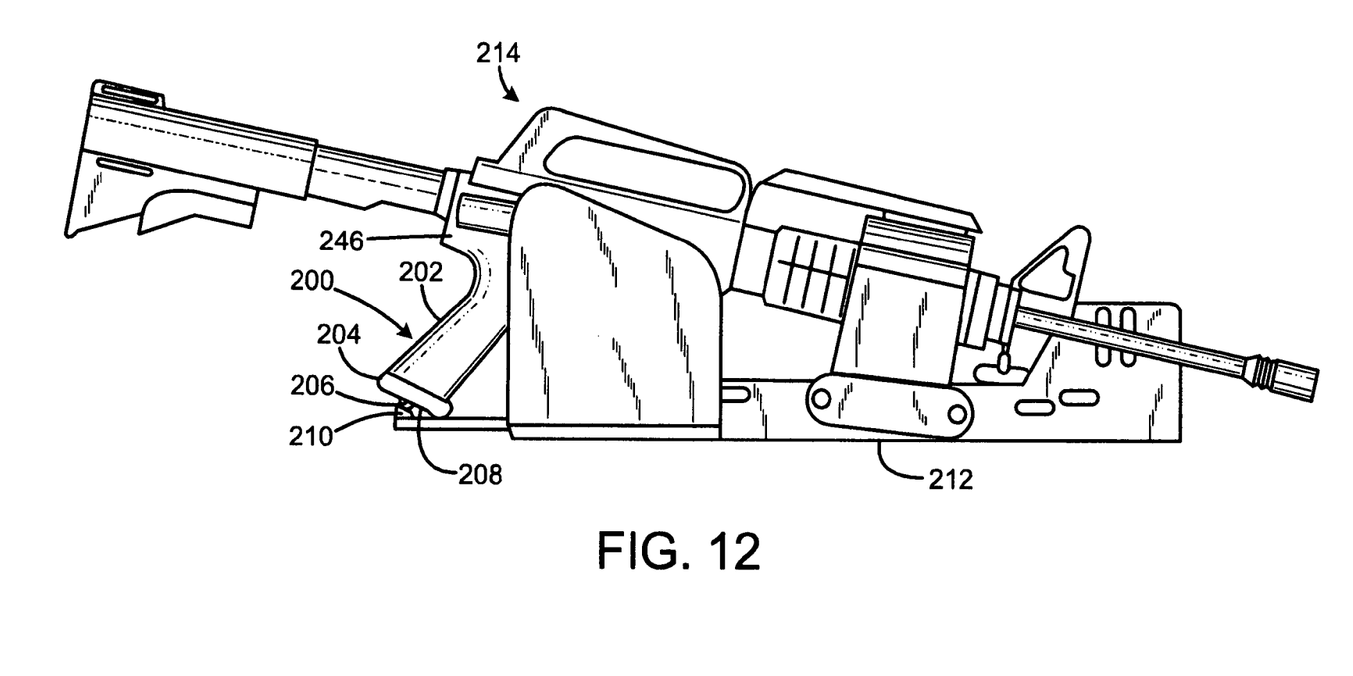
FIG. 12 is a side view of an AR-15 rifle with a fourth embodiment of the firearm accessory part of the present invention attached to its grip stored in a rack.

FIG. 12 illustrates the fourth embodiment of the improved firearm accessory part 200 of the present invention attached to grip 202 of an AR-15 rifle 214. More particularly, the firearm accessory part 200 has a pressure switch cap 206 that protrudes from an end cap 204 on the bottom 208 of the grip. The rack 212 has a switch activator 210 that activates a pressure switch 250 positioned beneath the pressure switch cap while the rifle is stored in the rack.

Figure 13:
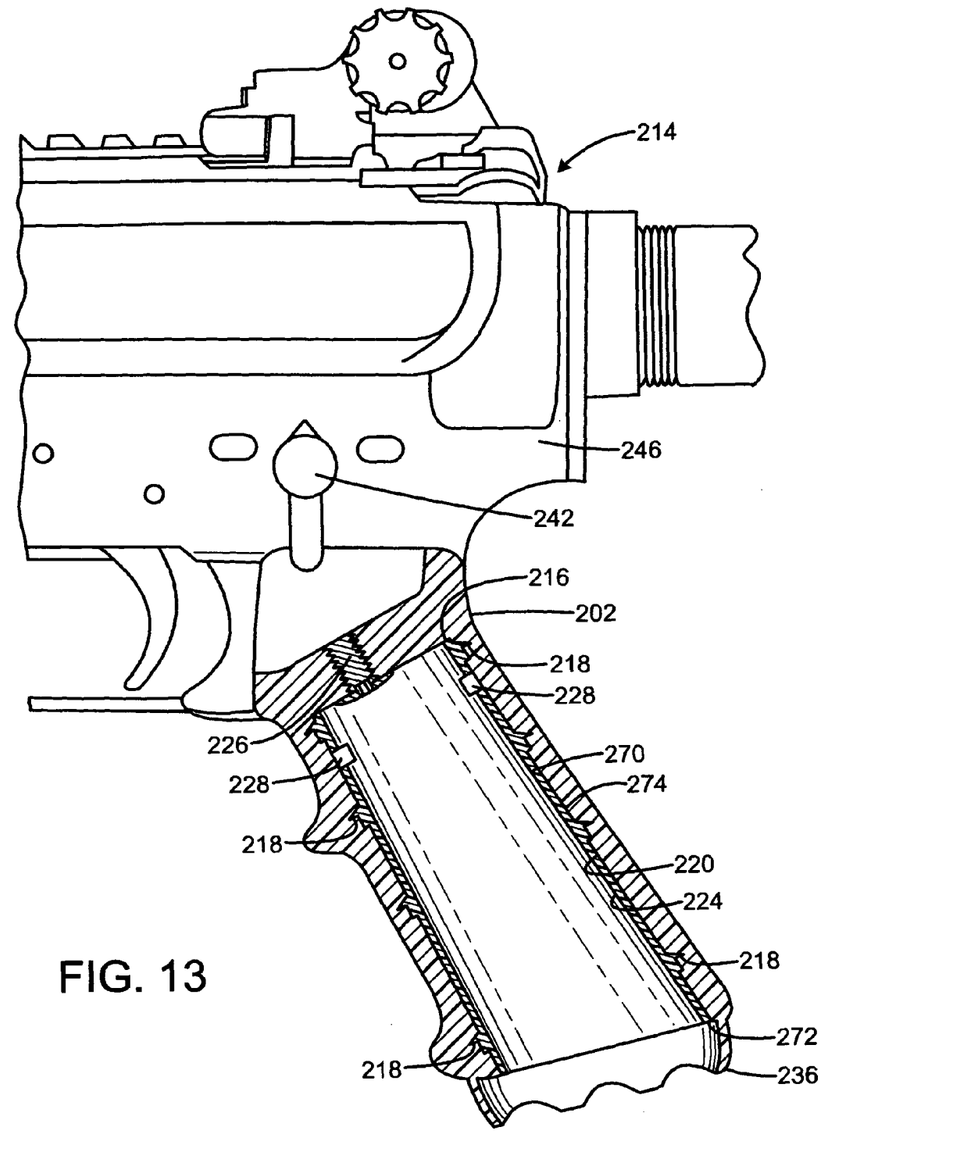
FIG. 13 is a side sectional view of a first embodiment of an outer sleeve suitable for use with the fourth embodiment of the firearm accessory part of the present invention installed in a grip.

FIG. 13 illustrates a first embodiment of an outer sleeve 270 suitable for use with the improved firearm accessory part 200 of the present invention installed in grip 202. More particularly, the outer sleeve 270 is hollow with an open top 216 and bottom 272. The sleeve interior 224 defines two tab slots 228 adjacent to the top 216.

The sleeve exterior 274 defines one or more securing hooks 218. When the outer sleeve is installed within the grip interior 220, the outer sleeve is expanded so the securing hooks grab the grip interior 220 to hold the outer sleeve within the grip.

The open top 216 of the outer sleeve 270 permits the grip screw 226 to be installed normally to attach the grip to the lower receiver 246 of the AR-15 rifle 214.

Figure 14:
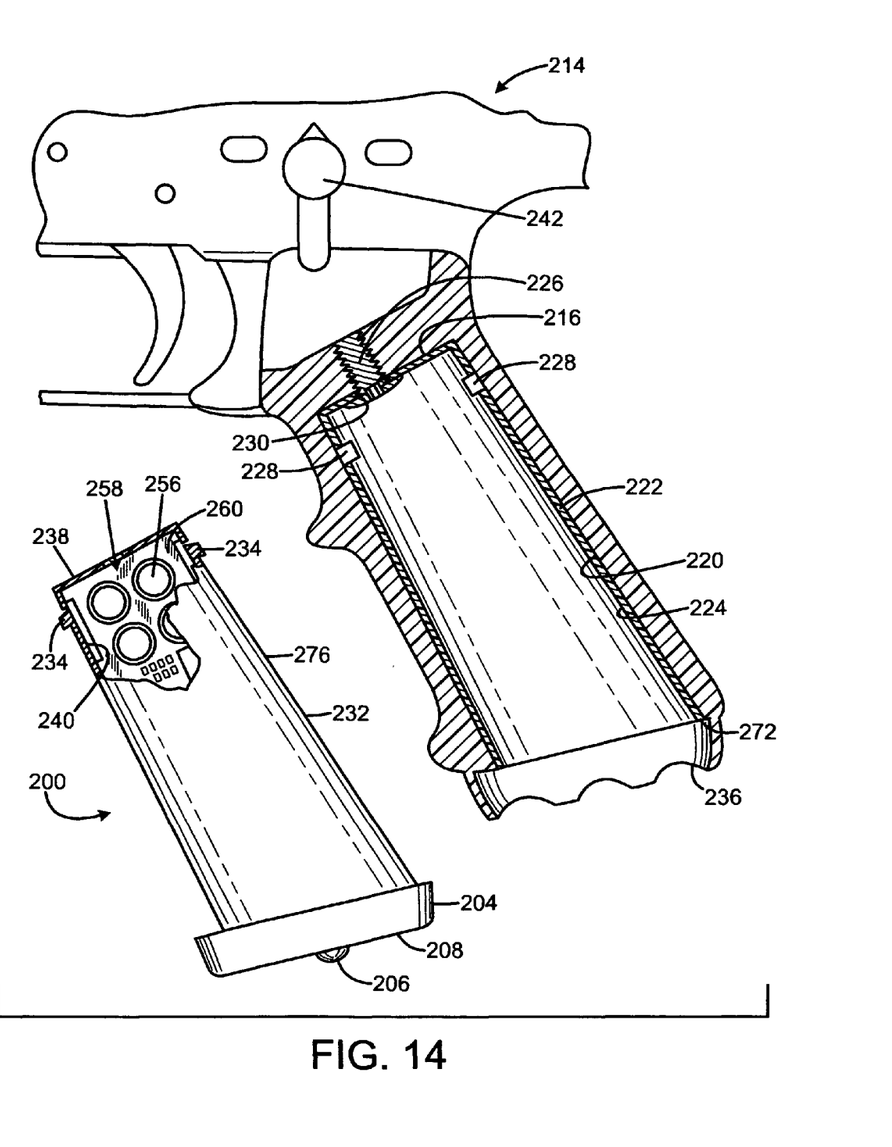
FIG. 14 is a side sectional fragmentary view of a second embodiment of an outer sleeve suitable for use with the fourth embodiment of the firearm accessory part of the present invention installed in a grip.

FIG. 14 illustrates a second embodiment of an outer sleeve 270 suitable for use with the improved firearm accessory part 200 of the present invention installed in grip 202 and the improved firearm accessory part 200. More particularly, the outer sleeve 222 is hollow with a substantially closed top 216 and an open bottom 272. The top 216 defines an aperture 230 that permits passage of the threaded portion of the grip screw 226. The sleeve interior 224 defines two tab slots 228 adjacent to the top 216.

The firearm accessory part 200 has a housing 232. The housing has two tabs 234 attached near its top 238 that extend outwards from its exterior 276. The bottom 208 of the housing terminates in an end cap 204. The interior 240 of the housing is hollow and receives a printed circuit board assembly 258 that will be described in more detail in the discussion of FIG. 15. A pressure switch cap 206 extends downwards through an aperture 280 in the end cap.

Figure 15:
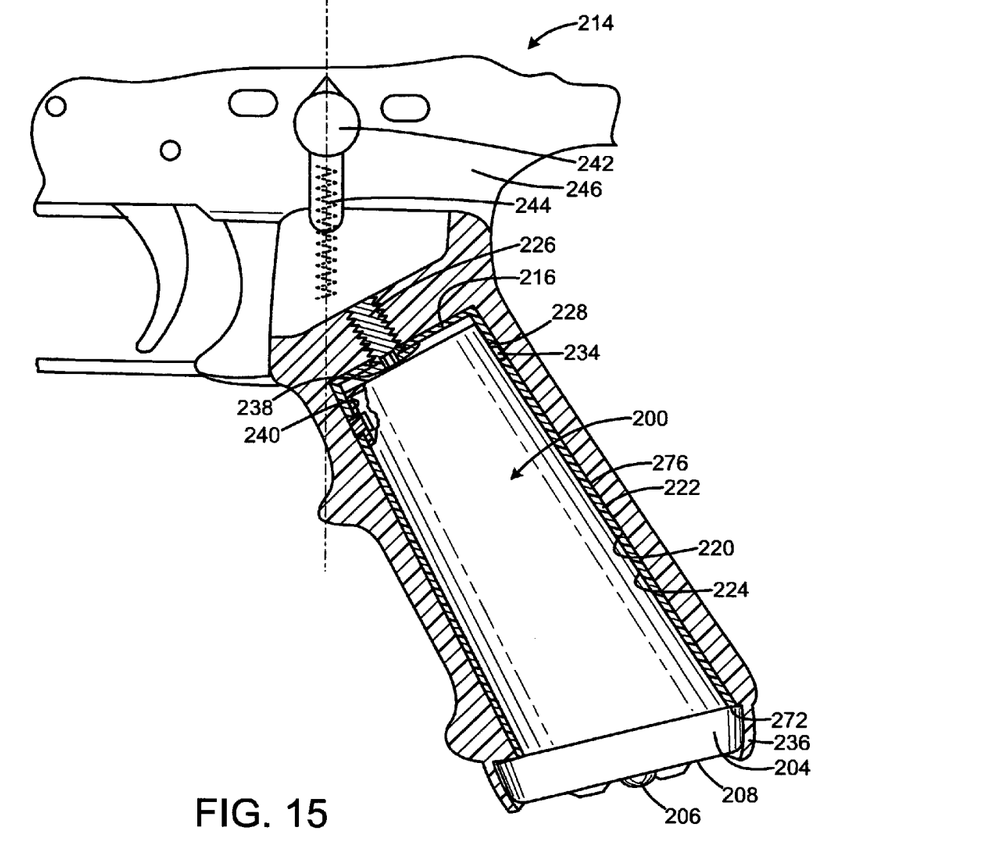
FIG. 15 is a side sectional view of the fourth embodiment of the firearm accessory part of the present invention installed in a grip.

FIG. 15 illustrates the improved firearm accessory part 200 of the present invention installed in grip 202. More particularly, the open bottom 272 of both embodiments of the outer sleeve enables the housing 232 of the firearm accessory part 200 to be received by the outer sleeve. The tab slots 228 in both embodiments of the outer sleeve receive the tabs 234 on the exterior 276 of the housing to retain the firearm accessory part 200 within the grip.

In the grip, there is a feature that secures the selector spring 244 for the selector detent within the lower receiver 246. If the grip 202 is removed to separate the firearm accessory part 200 from the firearm, the selector spring will fall out of the lower receiver. This prevents the detent from holding, so the selector switch 242 will also fall out. The absence of the selector switch prevents the rifle from firing.

Figure 16:
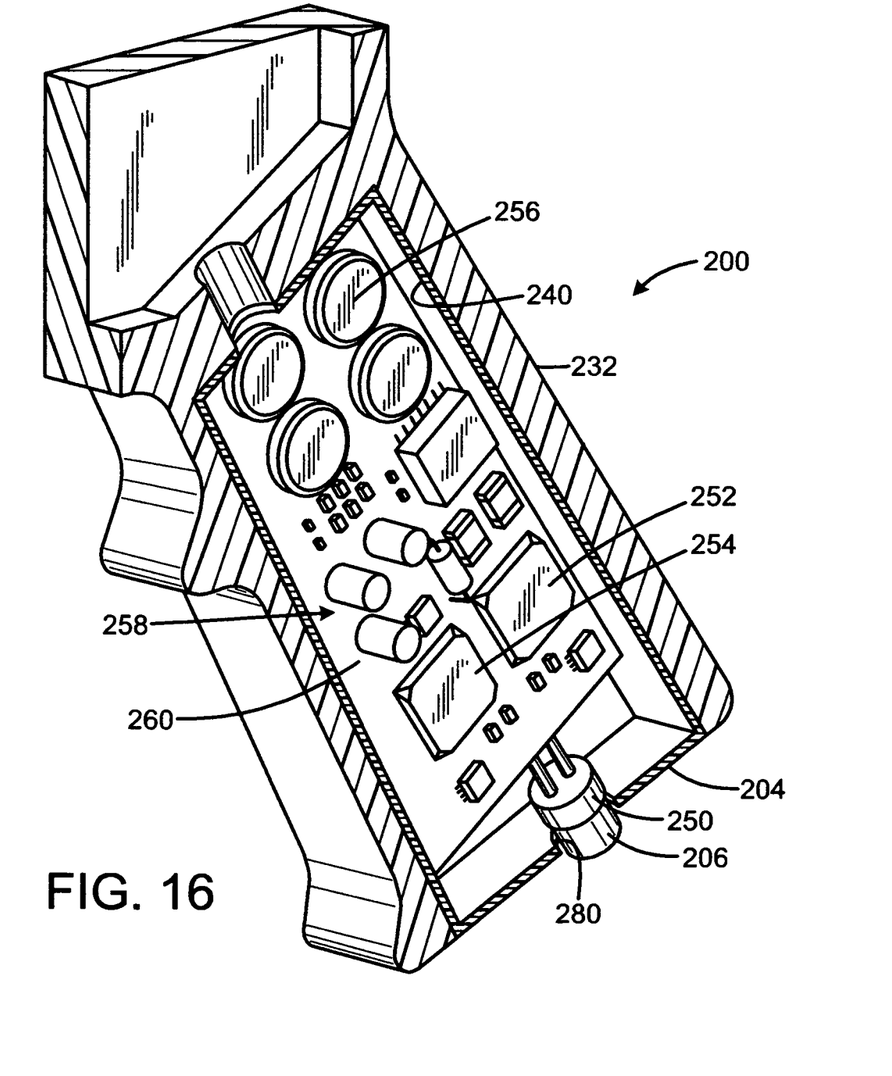
FIG. 16 is a side sectional view of the fourth embodiment of the firearm accessory part of the present invention with its internal components exposed.

FIG. 16 illustrates the improved firearm accessory part 200 of the present invention with its internal components exposed. More particularly, the interior 240 of the hollow housing 232 receives a printed circuit board assembly 258. The circuit board assembly consists of a substrate 260 that has multiple components mounted on it. The components include one or more batteries 256, a locator module 252, and a transmitter/control module 254. The locator module 252, transmitter/control module 254, and batteries 256 have the same characteristics and functions as the locator module 36, transmitter/control module 38, and batteries 40.

A pressure switch cap 206 protrudes downwards through the aperture 280 in the end cap 204. A pressure switch 250 is positioned inside of the housing 232 behind the pressure switch cap.

Conductive pathways etched on the substrate electrically connect the pressure switch to the locator module. Additional conductive pathways etched on the substrate electrically connect the locator module to the transmitter/control module and electrically connect the transmitter/control module to the batteries.

The end cap cannot be removed without a special tool to prevent tampering with the firearm accessory part 200.

While current embodiments of the firearm accessory part have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, while pistols, shotguns, and AR-15 rifles as described are the most likely contemplated application for the concepts of the present invention, it should be appreciated that the current invention could be used with any type of firearm. In addition, although mounting the firearm accessory part inside of an AR-15 rifle grip has been described, the firearm accessory part could also be mounted in the buffer tube of an AR-15 rifle or in a butt pad. Alternatively, although a pressure switch activated by a switch activator has been described, a magnet could be used to activate or deactivate a switch to establish if the firearm is in storage. Also, when the firearm accessory part 300 replaces a stock shotgun magazine tube end cap, it could be longer than illustrated to extend down into the shotgun magazine tube. This would eliminate the need for all of the illustrated components to be fully enclosed by the housing.

Furthermore, a tether unit could be used in lieu of a switch to establish the firearm is in storage. If the firearm is stored in a gun safe, the firm would be tethered into the safe, but not necessarily locked into a rack. A control unit mounted inside the gun safe would be hard wired for power, but could also run off of batteries. The control unit would have a keypad on the top of the unit, so each authorized user could have their own password. The control unit would have cables connected to each gun in the safe, tethering each firearm to the control unit. The tethers could be plugged in to a receptacle on the locator module firearm, or the tethers could be attached to the locator module on the gun with a magnet. If the gun is removed from the safe, and the tether is taken off, the control unit could notify the owner, either by text, email, or any other option that the gun has been removed from the safe. When the locator module on the gun is separated from the tether, it would activate itself and begin transmitting its position. The keypad on the control unit would be used to deactivate the locator module prior to disconnecting the tether from the firearm. So, if an authorized user opens the safe and correctly enters his password, the locator module would be deactivated.

In addition, the locator module, transmitter/control module, batteries, and switch could be located on a holster instead of, or in addition to, similar components on a firearm. The holster-mounted components can be used to track the location of the officer if he has lost possession of his or her firearm. The transmitter/control module could be set to transmit location data if the firearm were removed more than a specified distance from the holster, such as 3 feet.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A firearm accessory part for a firearm having an operational element that is essential for the firearm to discharge, comprising:
a locator module operable to determine the locator module's position;
a transmitter module connected to the locator module;
the transmitter module being operable to transmit the position of the locator module; and
wherein the firearm accessory part including the locator and transmitter modules is a replacement part for a firearm having a mounting location such that the firearm accessory part contacts the operational element of the firearm and such that removal of the firearm accessory part renders the firearm inoperable.

2. The firearm accessory part of claim 1 wherein removal of the firearm from a storage device activates the locator module and transmitter module.

3. The firearm accessory part of claim 2 wherein the storage device is selected from the group comprising holsters, racks, and safes.

4. The firearm accessory part of claim 2 wherein activation of the locator module and transmitter module upon removal of the firearm from a storage device is accomplished by relief of pressure applied by the storage device to a portion of the firearm accessory part.

5. The firearm accessory part of claim 1 wherein the firearm accessory part is selected from the group comprising guide rods for a pistol, closures for a magazine tube of a shotgun, and grips for a rifle.

6. A method of assembling a firearm having an operational element that is essential for the firearm to discharge comprising:
obtaining a firearm;
obtaining a firearm accessory part comprising a locator module operable to determine the locator module's position, a transmitter module connected to the locator module, and the transmitter module being operable to transmit the position of the locator module;
removing a part of the firearm connected to an attachment location; and
replacing the part removed from the firearm by installing the firearm accessory part at the attachment location;
wherein the firearm accessory part contacts the operational element of the firearm; and
wherein removal of the firearm accessory part from the firearm renders the firearm inoperable until the part removed from the firearm or the firearm accessory part is replaced.

7. The method of claim 6, wherein the contacted operational element is selected from the group comprising a pistol slide barrel lug, a shotgun magazine tube, and a rifle lower receiver.

8. The method of claim 6, wherein the firearm accessory part secures an operational element of the firearm to the firearm.

9. The method of claim 8, wherein the secured operational element is selected from the group comprising a pistol recoil spring, a shotgun magazine spring, a shotgun shell follower, a rifle selector spring, and a rifle selector switch.

10. The method of claim 6 wherein removal of the firearm from a storage device activates the locator module and transmitter module.

11. The method of claim 10 wherein the storage device is selected from the group comprising holsters, racks, and safes.

12. The method of claim 10 wherein activation of the locator module and transmitter module upon removal of the firearm from a storage device is accomplished by relief of pressure applied by the storage device to a portion of the firearm accessory part.

13. The method of claim 6 wherein the firearm accessory part is selected from the group comprising guide rods for a pistol, closures for a magazine tube of a shotgun, and grips for a rifle.

* * * * *